J. BINGHAM.
ROLL HOUSING FOR ROLLER BEARINGS AND METHOD OF FORMING THE SAME.
APPLICATION FILED SEPT. 28, 1917.
1,275,371.
Patented Aug. 13, 1918.
2 SHEETS—SHEET 1.
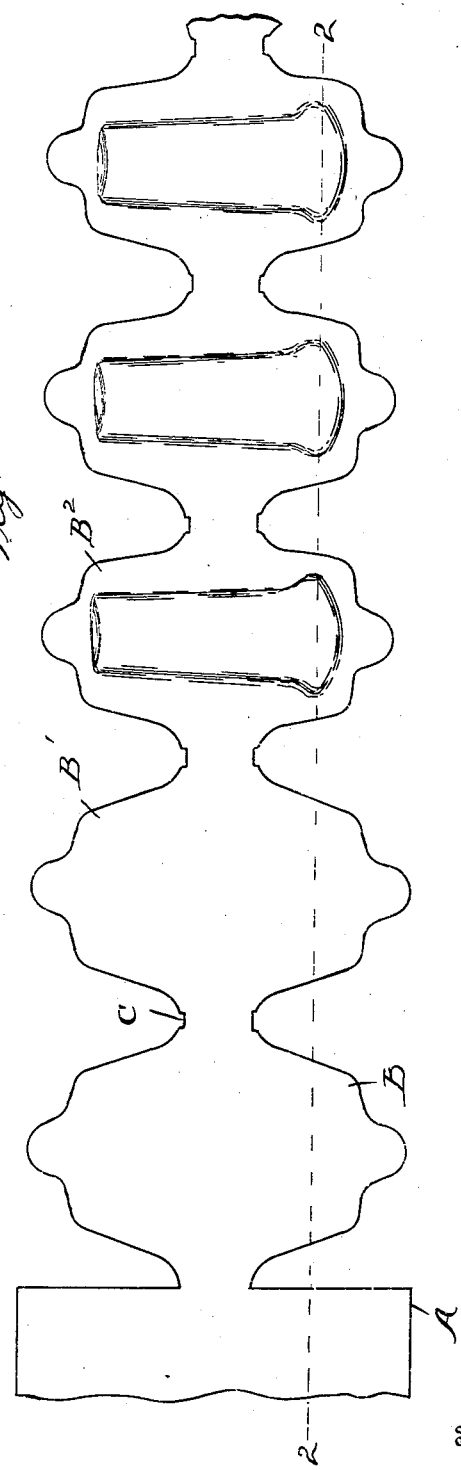
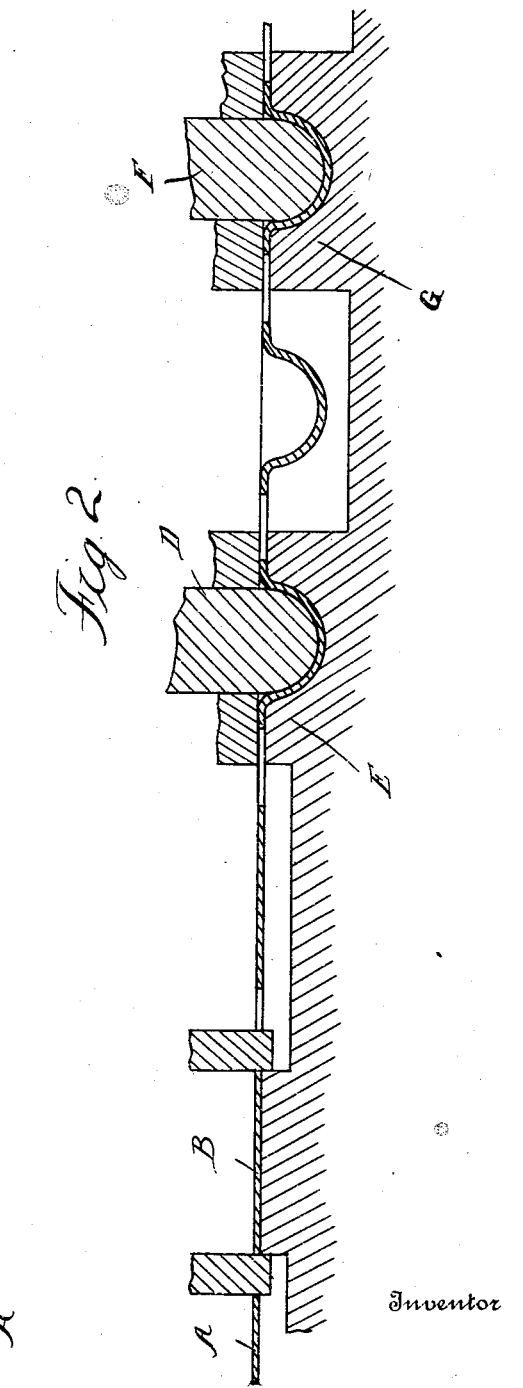
Inventor
Jeremiah Bingham
By Whittemore Hulbert & Whittemore
Attorneys J. BINGHAM.
ROLL HOUSING FOR ROLLER BEARINGS AND METHOD OF FORMING THE SAME.
APPLICATION FILED SEPT. 28, 1917.
1,275,371.
Patented Aug. 13, 1918.
2 SHEETS—SHEET 2.
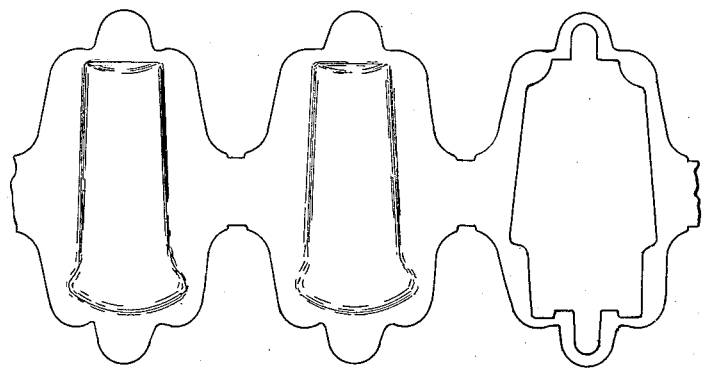
*Fig. 3.*
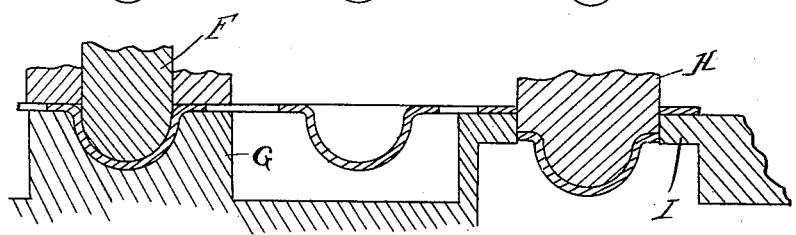
*Fig. 4.*
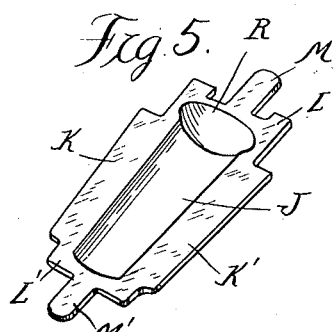
*Fig. 5.*
 
*Fig. 6.* *Fig. 7.* *Fig. 8.*
  
*Fig. 11.* *Fig. 12.* *Fig. 13.*
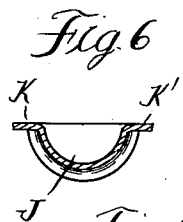
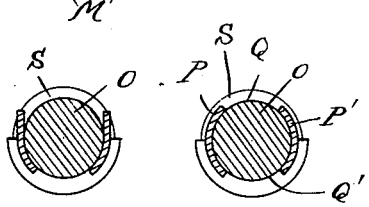
*Fig. 9.* *Fig. 10.*
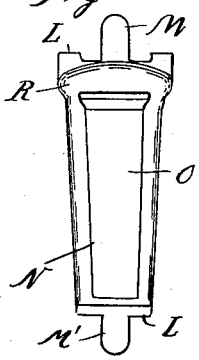
Inventor
Jeremiah Bingham
By Whittemore Hulbert & Whittemore
Attorneys

UNITED STATES PATENT OFFICE.

JEREMIAH BINGHAM, OF TOLEDO, OHIO, ASSIGNOR TO THE BOCK BEARING COMPANY, OF TOLEDO, OHIO, A CORPORATION OF OHIO.

ROLL-HOUSING FOR ROLLER-BEARINGS AND METHOD OF FORMING THE SAME.

1,275,371.     Specification of Letters Patent.     Patented Aug. 13, 1918.

Application filed September 28, 1917. Serial No. 193,715.

*To all whom it may concern:*

Be it known that I, JEREMIAH BINGHAM, a citizen of the United States of America, residing at Toledo, in the county of Lucas and State of Ohio, have invented certain new and useful Improvements in Roll-Housings for Roller-Bearings and Methods of Forming the Same, of which the following is a specification, reference being had therein to the accompanying drawings.

The invention relates to the manufacture of roller bearings of that type in which the rolls are individually housed, said housings being secured in a predetermined relation to constitute a cage. The present invention relates more particularly to the construction of the roll housing and the method of forming the same, as hereinafter set forth.

In the drawings:

Figure 1 is a plan view showing a blank and the successive steps of forming the individual housings therefrom;

Fig. 2 is a vertical section on line $x-x$ of Fig. 1, showing the relation of the blanking and forming dies;

Figs. 3 and 4 are views similar respectively to Figs. 1 and 2, showing succeeding steps in the forming operation;

Fig. 5 is a perspective view of the partially formed housing as first severed from the sheet-metal blank;

Figs. 6, 7 and 8 are cross-sections, showing the successive steps of completing the housing;

Fig. 9 is a cross-section showing the manner of engagement of the roll with the housing;

Fig. 10 is a similar view with the housing closed around the roll; and

Figs. 11, 12 and 13 are respectively a front elevation, rear elevation and side elevation of the housed unit.

A is a sheet-metal strip which is fed to the forming dies. This strip is first blanked to form a series of sections B, centrally connected at C and of an external contour suitable for the subsequent drawing operation. D and E are the first drawing or forming dies, which operate upon an advance section $B^2$ of the blank, with a section B' between the same and the section being externally blanked. This will permit of the simultaneous operation of the blanking and forming dies and will also permit of the drawing of the metal without restraint as it is needed to produce the refashioned form. F and G are a second pair of forming dies for further fashioning the blank, and which operate to compress portions of the metal which were under tension in the first forming operation, thereby relieving any strains. H and I are the punching dies which sever the formed housing from the strip, these dies being also preferably arranged in the same press and operating simultaneously with the operation of the forming dies D E and F G.

The steps thus far described are all performed successively on the individual housings but simultaneously on the same blank, and as a result of the operations the blank is in the form illustrated in Fig. 5, having a concave portion J for receiving the roll, laterally-projecting flanges K and K' on opposite sides thereof, end flanges L and L' and central tongues M and M' projecting from said end flanges. The succeeding operation bends upward the lateral flanges K and K' to extend in parallelism, as shown in Fig. 7. The blank is then punched to cut out the bottom thereof, as indicated at N, after which the roll O is placed in the concave portion and the flanges K and K' are closed about the roll, as indicated in Fig. 10. This forms arc-shaped portions P and P' on diametrically opposite sides of the roll, with cut-away segments Q and Q' permitting the roll to contact with its coöperating race-members. One end of the housing is enlarged at R to receive the enlarged head S of the roll, which head has a spherical end, the enlargement R being of a similar form.

The construction described is one which permits of forming a number of different sized roller bearing units from the same housed rolls, the only difference being the size and shape of the connector. Furthermore, each individual roll is securely held from displacement in any direction and the housing thereof is capable of being rigidly mounted in predetermined relation to adjacent housings, so that the rolls will be retained in proper alinement.

What I claim as my invention is:

1. The method of forming roll housings, comprising the pressing of a sheet-metal blank to form a recess for receiving and fitting about one side of the roll and also provided with flanges projecting from the opposite sides thereof, cutting away a segment from the bottom of said blank to expose the bearing portion of the roll, placing the roll in said recess, and bending said flanges about the roll to retain the same.

2. The method of forming roll housings, comprising the cutting of a flat sheet-metal blank to a predetermined contour, pressing a concave recess therein adapted to fit about one side of the roll, leaving a laterally-extending marginal flange, cutting said marginal flange to form separate side and end portions, cutting a segment from the bottom of the recessed portion to expose the bearing portion of the roll, placing the roll in said recess, and closing said flanges about the roll to retain the same.

3. The method of forming roll housings, comprising cutting a flat sheet-metal blank to a predetermined contour, pressing the central portion of said blank to form a recess therein for receiving the roll and leaving a laterally-extending marginal flange, cutting said marginal flange to separate side portions from the end portions thereof, bending said side portions into substantially parallel planes spaced to receive the roll therebetween and to form retainers for closing about the roll when in the recess, and cutting out a segment from the bottom of the recessed portion to expose the bearing portion of the roll when placed therein.

4. The method of forming roll housings, comprising the advancing of a sheet-metal strip, blanking said strip into centrally connected sections of a predetermined external contour, pressing said sections while still connected to said strip to form centrally recessed portions for receiving and fitting about the rolls with a laterally-extending marginal flange thereabout, and trimming the marginal flange to form separate side and end flanges and to sever the same from the blank.

5. The method of forming roll housings, comprising the advancing of a sheet-metal blank to successive points of operation, blanking said strip at one point to form thereof centrally connected sections of predetermined external contour, pressing each section at another point to form a central recess therein for receiving and fitting about the roll, the metal for forming the depression being drawn from the margin of the blank while still attached to the strip and leaving a flat marginal flange, and trimming said flange at another point in the advancement of said strip to form separate side and end flanges and to sever the housings from the strip.

6. A roll housing, comprising a pressed sheet-metal member having a recess for receiving and fitting around one side of a roll, a segment of the bottom of said recess being cut away, flanges extending laterally from the opposite ends of the recessed portion, and flanges extending substantially parallelly from the sides of the recessed portion and adapted for closing around the opposite side of the roll to retain the same in said recess.

7. A roll housing, comprising a pressed sheet-metal member forming a recess for receiving and fitting about one side of a roll, the bottom of said recess being cut-away to expose a segment of the roll, one end of said housing being enlarged to receive the enlarged head of the roll and being of a segmental spherical form, the ends of the housing having laterally-extending flanges and the sides having substantially parallelly extending flanges adapted to be closed around the opposite side of the roll when in the recess to retain the same from displacement.

In testimony whereof I affix my signature.

JEREMIAH BINGHAM.